Nov. 21, 1961 M. A. USAB 3,009,476
CHECK VALVE HAVING HIGH AND LOW PRESSURE SEALS
Filed Aug. 8, 1958
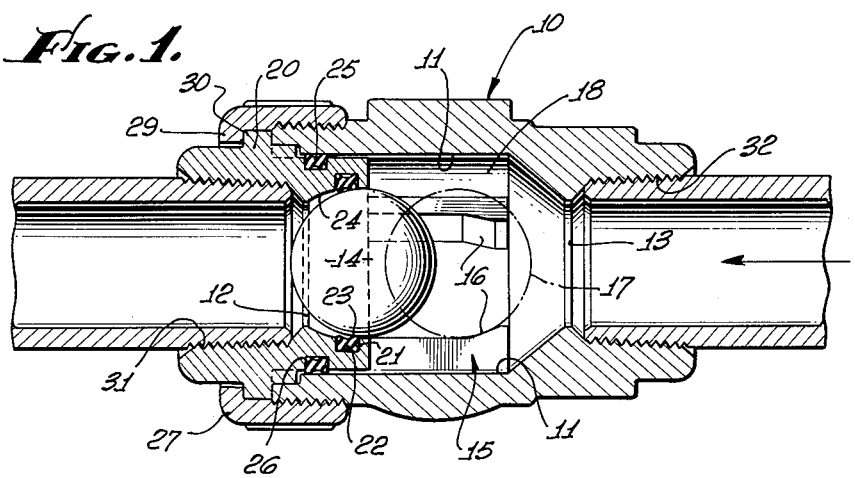
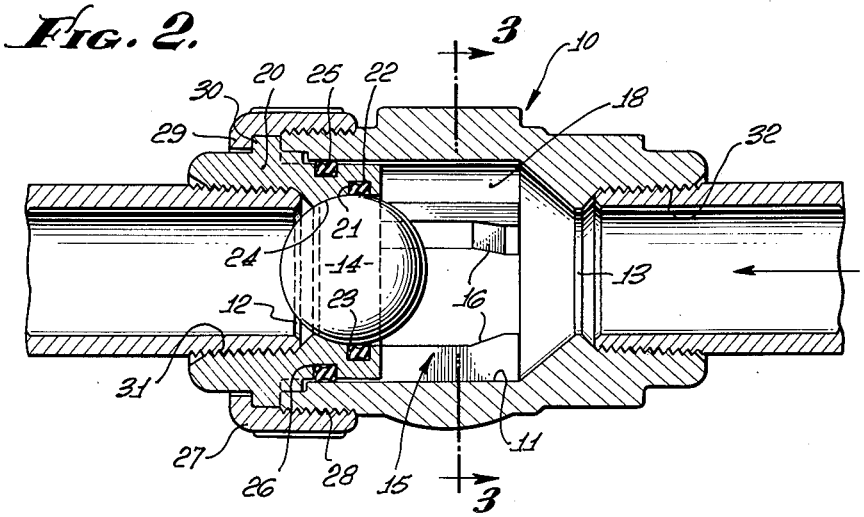
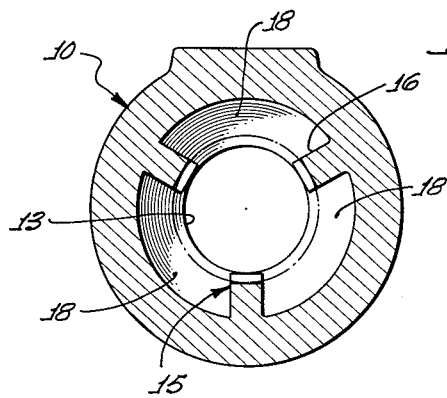
MARTIN A. USAB,
INVENTOR.
BY
John Joseph Hall
ATTORNEY.

United States Patent Office 3,009,476
Patented Nov. 21, 1961

3,009,476
CHECK VALVE HAVING HIGH AND LOW PRESSURE SEALS
Martin A. Usab, Costa Mesa, Calif., assignor, by mesne assignments, to Consolidated Thermoplastics Company, Stamford, Conn., a corporation of Delaware
Filed Aug. 8, 1958, Ser. No. 754,031
2 Claims. (Cl. 137—516.29)

This invention relates to improvements in check valves, and in particular to check ball valves. Existing check ball valves are commonly designed to provide a low pressure seal or a high pressure seal. Such valves are not capable of providing both a low pressure seal and a high pressure seal in a single valve, but are limited to one or the other.

It is an object of my invention to provide a check ball valve capable of providing both a low pressure seal and a high pressure seal.

Another object of my invention is to provide a check ball valve of relatively simple design which can be manufactured by using inexpensive materials and methods of manufacture.

A further object of my invention is to provide a check ball valve which is easy to assemble and disassemble.

These and other objects will be more readily understood by reference to the following description and claims, taken in conjunction with the accompanying drawing forming a part hereof, in which FIGURE 1 is a longitudinal section of the check ball valve showing the device operating in the low pressure position.

FIGURE 2 is a longitudinal section of the check ball valve showing the device operating in the high pressure position.

FIGURE 3 is a cross section taken along line 3—3 of FIGURE 2.

With reference to the drawing, the body 10 of the check ball valve contains a uni-directional flow passage 11 with an inlet opening 12 and an outlet opening 13. The interior of the body 10 houses the check ball 14 which is retained in a cage 15 formed by ball guides 16. Under conditions of flow through the valve, the cage maintains a central location, relatively, of the ball at 17 and maintains flow passages at 18 around the ball. The cage 15 also restricts motion of the ball to a linear movement as the ball rides freely on the ball guides 16.

The inlet end connector 20 has a groove 21 in the inner circumference of its inner end adapted to receive a pressure seal 22 of the O-ring or quad-ring type having a lip 23 for sealing at low pressure sealing conditions in conjunction with the check ball 14. At high pressure sealing conditions, the inlet end connector 20 provides a seat at 24 for high pressure sealing in conjunction with the pressure seal 22 and the check ball 14. Leakage of material out of the flow passage 11 of the body 10 is prevented by a seal 25 of the O-ring or other type seal inserted in the groove 26 of the outer circumference of the inner end of the inlet end connector 20.

The inlet end connector 20 is maintained in position by a union seal nut 27 threaded on the body at 28. The union seal nut 27 has a lip 29 which presses against a shoulder 30 of the inlet end connector 20, thereby keeping the inlet end connector in position.

The device is put into operation by threading piping into the inlet end connector flow passage 31 and to the outlet end 32 of the body 10; thereby locating the pressure seal 22 downstream of the seat 24. While material is flowing through the valve, the check ball 14 remains at the position 17, more or less. When the direction of flow is reversed and begins going against the valve, a pressure differential is created from one end of the valve to the other. This pressure differential causes the check ball 14 to move into a position of gentle contact with the lip 23 of the pressure seal 22 as shown in FIGURE 1, thereby creating a low pressure seal. At low pressure differentials, the contact of the ball with the lip 23 will maintain a low pressure seal until the pressure differential is reversed, breaking the low pressure seal.

If the pressure differential is increased over that producing a low pressure seal, the check ball 14 will displace the pressure seal 22 and the high pressure differential will force the ball into establishing solid contact with the seat 24 while the pressure seal 22 will be centrally positioned around the ball, thereby creating a high pressure seal as shown in FIGURE 2. The device will produce a high pressure seal operating at high pressure differentials limited only by the structural strength of the materials used to construct the valve.

At high pressure sealing conditions, when the pressure differential is reversed, a sufficient pressure differential is established in the opposite direction to cause the ball to begin to unseat itself and move against the seal 22. As the ball continues to move against the seal 22, it will continue to unseat itself until flow of material through the valve is established. The ball will continue to move along the ball guides 16 toward the opposite end of the cage 15 from the seat 24 so that flow passages at 18 around the ball may be maintained, thereby permitting unrestricted flow through the valve. Thus, my invention combines both low and high pressure seals in a single device.

While I have described my invention in detail with reference to the accompanying drawing illustrating the preferred form of my invention, it is understood that numerous changes in the details of construction and arrangement of parts may be made without departing from the spirit and scope of the invention as described and hereinafter claimed.

I claim:

1. In a check ball valve, the combination of: a body having a flow passage; a check ball disposed within the body; a connecting member having an inner end formed into a seat and a groove therein downstream of said seat and having a flow passage registering with the flow passage of the body; a resilient seal ring of less internal diameter than the diameter of said ball inserted in the groove of the connecting member and engageable with said ball to resist engagement of said ball with said seat to produce a low pressure seal at low pressure differentials within the valve, said seal ring being deformable permitting passage of said ball into engagement with said seat to produce a high pressure seal at high pressure differentials within the valve; and guide members in said body passage forming a cage guiding the check valve in a linear movement between sealing positions and flow positions of the valve.

2. In a check ball valve, the combination of: a body having separable means providing an inlet passage, a central passage and an outlet passage for fluid flow through the body, said separable means including connecting means having a valve seat and an annular groove for supporting a seal ring positioned downstream of said seat; a check ball disposed within said central passage of said body; a resilient seal ring of less internal diameter than the diameter of said ball inserted in said annular groove and engageable with said ball to resist engagement of said ball with said seat to produce a low pressure seal at low pressure differentials within the valve, said seal ring being deformable permitting passage of said ball into engagement with said seat to produce a high pressure seal at high pressure differentials within the valve; and guide means in said central passage of said body for guiding said check ball in a linear movement between sealing positions and flow positions of the valve and permitting fluid flow around said ball when in said flow positions.

References Cited in the file of this patent

UNITED STATES PATENTS

| | | |
|---|---|---|
| 343,327 | Lowrie | June 8, 1886 |
| 2,103,427 | Long | Dec. 28, 1937 |
| 2,381,484 | Blank | Aug. 7, 1945 |
| 2,673,062 | Cornelius | Mar. 23, 1954 |
| 2,847,182 | Mancusi | Aug. 12, 1958 |
| 2,878,896 | Farrell | Mar. 24, 1959 |

FOREIGN PATENTS

| | | |
|---|---|---|
| 12,911 | Great Britain | June 7, 1904 |